(12) United States Patent
Pfadler et al.

(10) Patent No.: US 12,609,758 B2
(45) Date of Patent: Apr. 21, 2026

(54) METHOD FOR A NETWORK ENTITY FOR CONTROLLING A COMMUNICATION, METHOD FOR A FIRST COMMUNICATION DEVICE, METHOD FOR A SECOND COMMUNICATION DEVICE, APPARATUS, VEHICLE AND COMPUTER PROGRAM

(71) Applicant: VOLKSWAGEN AKTIENGESELLSCHAFT, Wolfsburg (DE)

(72) Inventors: Andreas Pfadler, Berlin (DE); Luca Montero Bayo, Barcelona (ES)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 311 days.

(21) Appl. No.: 18/358,984

(22) Filed: Jul. 26, 2023

(65) Prior Publication Data

US 2024/0039621 A1     Feb. 1, 2024

(30) Foreign Application Priority Data

Jul. 28, 2022     (EP) ..................................... 22187656

(51) Int. Cl.
  *H04W 72/51*     (2023.01)
  *H04B 7/185*     (2006.01)
        (Continued)

(52) U.S. Cl.
  CPC ........ *H04B 7/18504* (2013.01); *H04W 64/00* (2013.01); *H04W 76/23* (2018.02)

(58) Field of Classification Search
  None
  See application file for complete search history.

(56) References Cited

U.S. PATENT DOCUMENTS 9,998,191 B2    6/2018  Mizusawa
10,313,839 B2    6/2019  Hwang et al.
          (Continued)

FOREIGN PATENT DOCUMENTS

CN      112261609 A  *  1/2021  .............. H04W 4/38
CN      114600505 A  *  6/2022  .............. H04W 4/46
          (Continued)

OTHER PUBLICATIONS

Office Action; European Patent Application No. 22187656.8; Nov. 20, 2024.

(Continued)

*Primary Examiner* — Mohammed Rachedine
(74) *Attorney, Agent, or Firm* — BARNES & THORNBURG LLP

(57)          ABSTRACT

A method for a network entity for controlling a communication between a first communication device and a second communication device including obtaining positions of communication devices and determining radiation boundary volumes in an environment of the communication devices based on the positions. Each radiation boundary volume includes a horizontal layer. A method including allocating the radiation boundary volume of radiation boundary volumes to the first communication device of communication devices to communicate with the second communication device of communication devices and transmitting information about the allocated radiation boundary volume to at least one of the first communication device and the second communication device.

28 Claims, 7 Drawing Sheets

(51) Int. Cl.

| | |
|---|---|
| *H04W 4/02* | (2018.01) |
| *H04W 4/40* | (2018.01) |
| *H04W 4/70* | (2018.01) |
| *H04W 64/00* | (2009.01) |
| *H04W 72/0446* | (2023.01) |
| *H04W 72/0453* | (2023.01) |
| *H04W 76/14* | (2018.01) |
| *H04W 76/23* | (2018.01) |
| *H04W 88/04* | (2009.01) |

(56) References Cited

U.S. PATENT DOCUMENTS

| | | | | |
|---|---|---|---|---|
| 11,102,728 | B2 | 8/2021 | Zhang et al. | |
| 2018/0352452 | A1* | 12/2018 | Parthasarathy | G08G 5/57 |
| 2020/0275455 | A1 | 8/2020 | Fanelli et al. | |
| 2021/0045067 | A1* | 2/2021 | Zhang | H04L 5/0023 |
| 2025/0076485 | A1* | 3/2025 | Reisinger | H04W 4/40 |
| 2025/0168708 | A1* | 5/2025 | Wang | H04W 72/04 |

FOREIGN PATENT DOCUMENTS

| | | | | | |
|---|---|---|---|---|---|
| CN | 114788345 | A | * | 7/2022 | H04W 4/029 |
| CN | 117500057 | A | * | 2/2024 | H04W 72/04 |

OTHER PUBLICATIONS

Extended European Search Report; European Patent Application No. 22187656.8; Mar. 22, 2023.

* cited by examiner

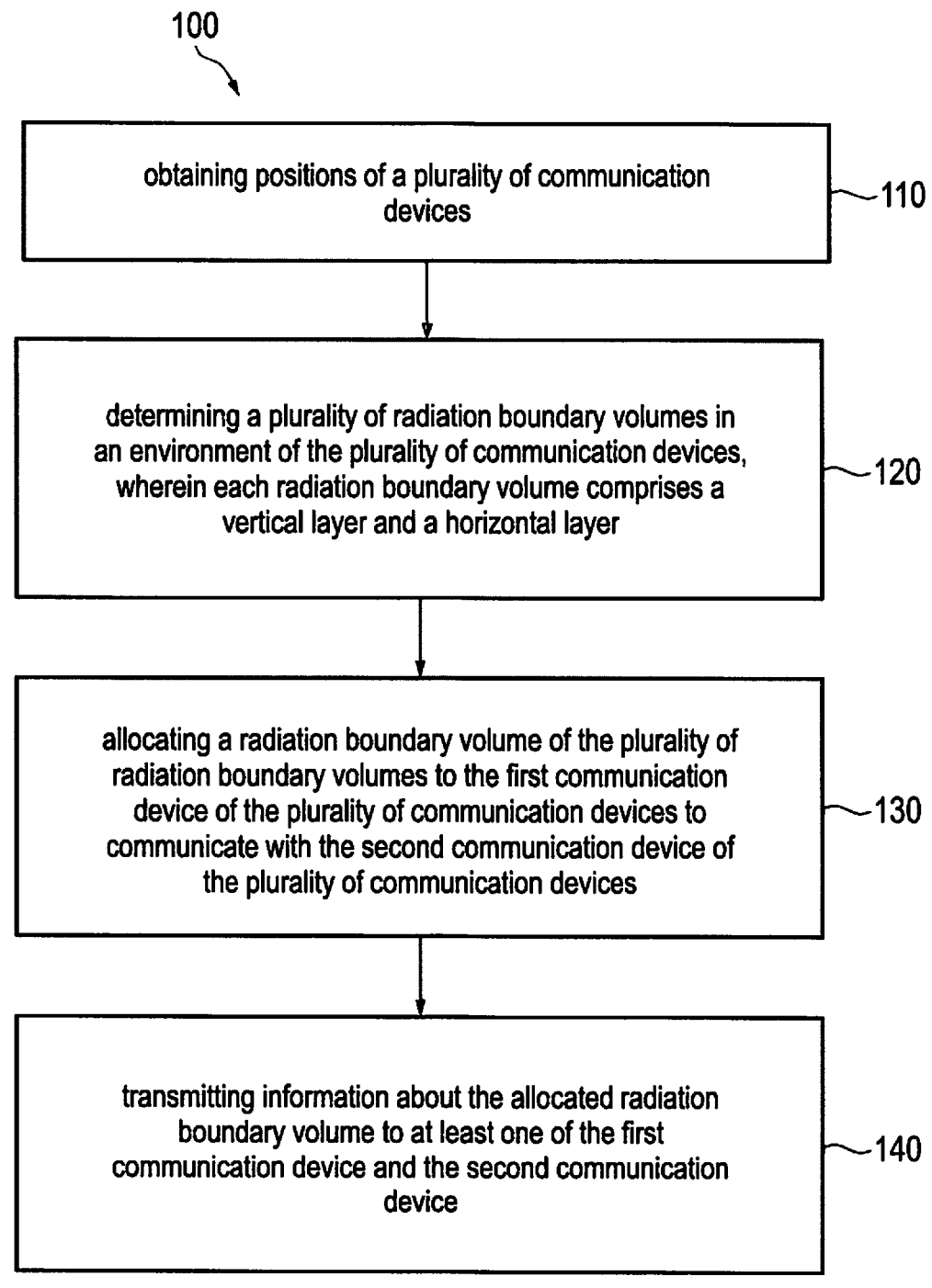

100 obtaining positions of a plurality of communication devices ~110 determining a plurality of radiation boundary volumes in an environment of the plurality of communication devices, wherein each radiation boundary volume comprises a vertical layer and a horizontal layer ~120 allocating a radiation boundary volume of the plurality of radiation boundary volumes to the first communication device of the plurality of communication devices to communicate with the second communication device of the plurality of communication devices ~130 transmitting information about the allocated radiation boundary volume to at least one of the first communication device and the second communication device ~140

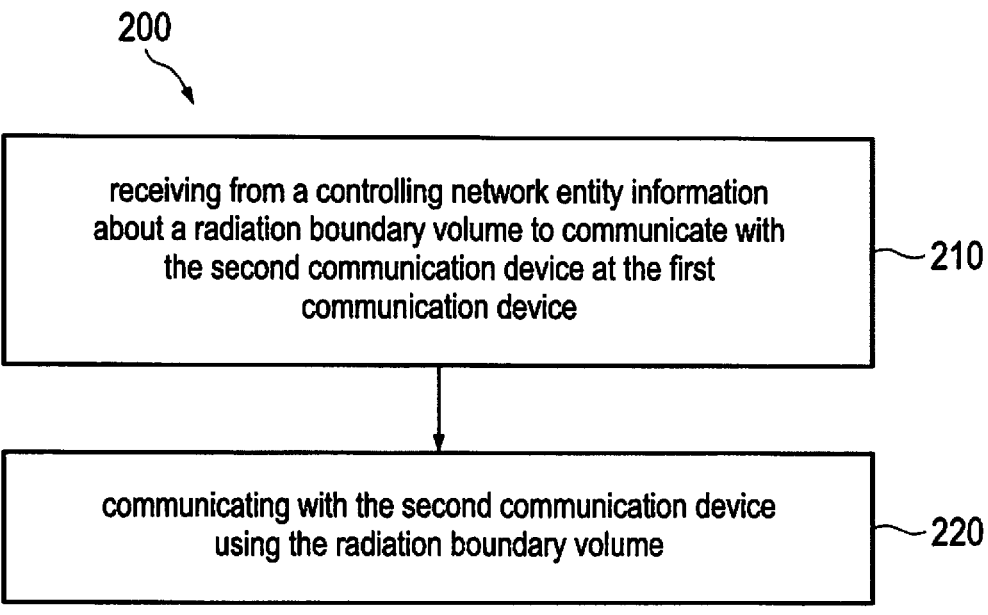

receiving from a controlling network entity information about a radiation boundary volume to communicate with the second communication device at the first communication device — 210 communicating with the second communication device using the radiation boundary volume — 220

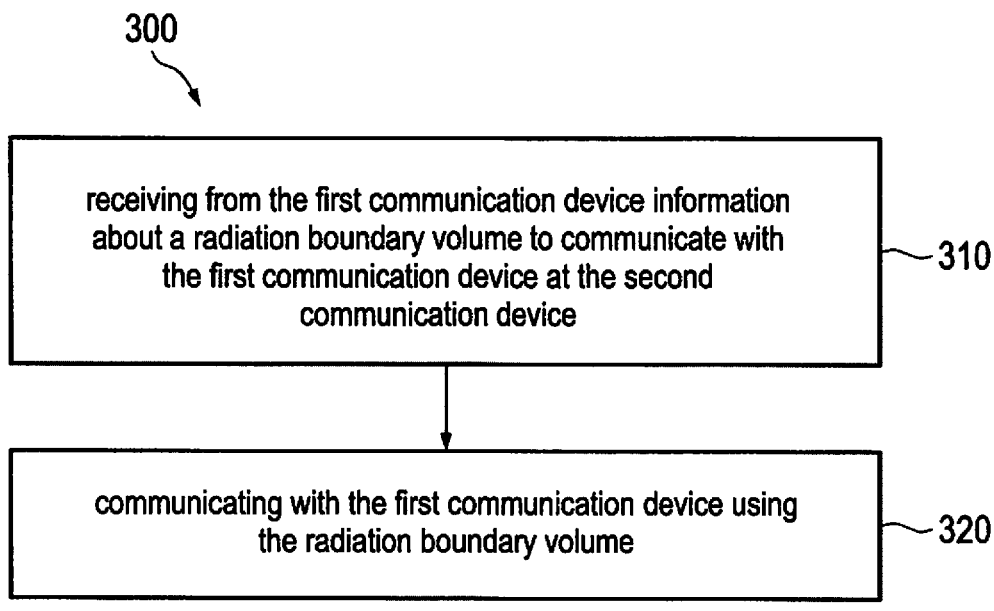

receiving from the first communication device information about a radiation boundary volume to communicate with the first communication device at the second communication device — 310 communicating with the first communication device using the radiation boundary volume — 320

METHOD FOR A NETWORK ENTITY FOR CONTROLLING A COMMUNICATION, METHOD FOR A FIRST COMMUNICATION DEVICE, METHOD FOR A SECOND COMMUNICATION DEVICE, APPARATUS, VEHICLE AND COMPUTER PROGRAM

PRIORITY CLAIM

This patent application claims priority to European Patent Application No. 22187656.8, filed 28 Jul. 2022, the disclosure of which is incorporated herein by reference in its entirety.

SUMMARY

Illustrative embodiments relate to the field of wireless communication. Illustrative embodiments relate to a method for a network entity for controlling a communication, a method for a first communication device, a method for a second communication device, an apparatus, a transportation vehicle and a computer program, more particularly, but not exclusively, to a concept for controlling a communication between a first communication device and a second communication device, e.g., to utilize a radiation boundary volume for controlling the communication between the first communication device and the second communication device.

BRIEF DESCRIPTION OF THE DRAWINGS

Disclosed embodiments will be described with reference to the accompanying figures, in which:

FIG. 1 shows an exemplary method for a network entity;

FIG. 2 shows an exemplary method for a first communication device;

FIG. 3 shows an exemplary method for a second communication device;

DETAILED DESCRIPTION

Figure 4:
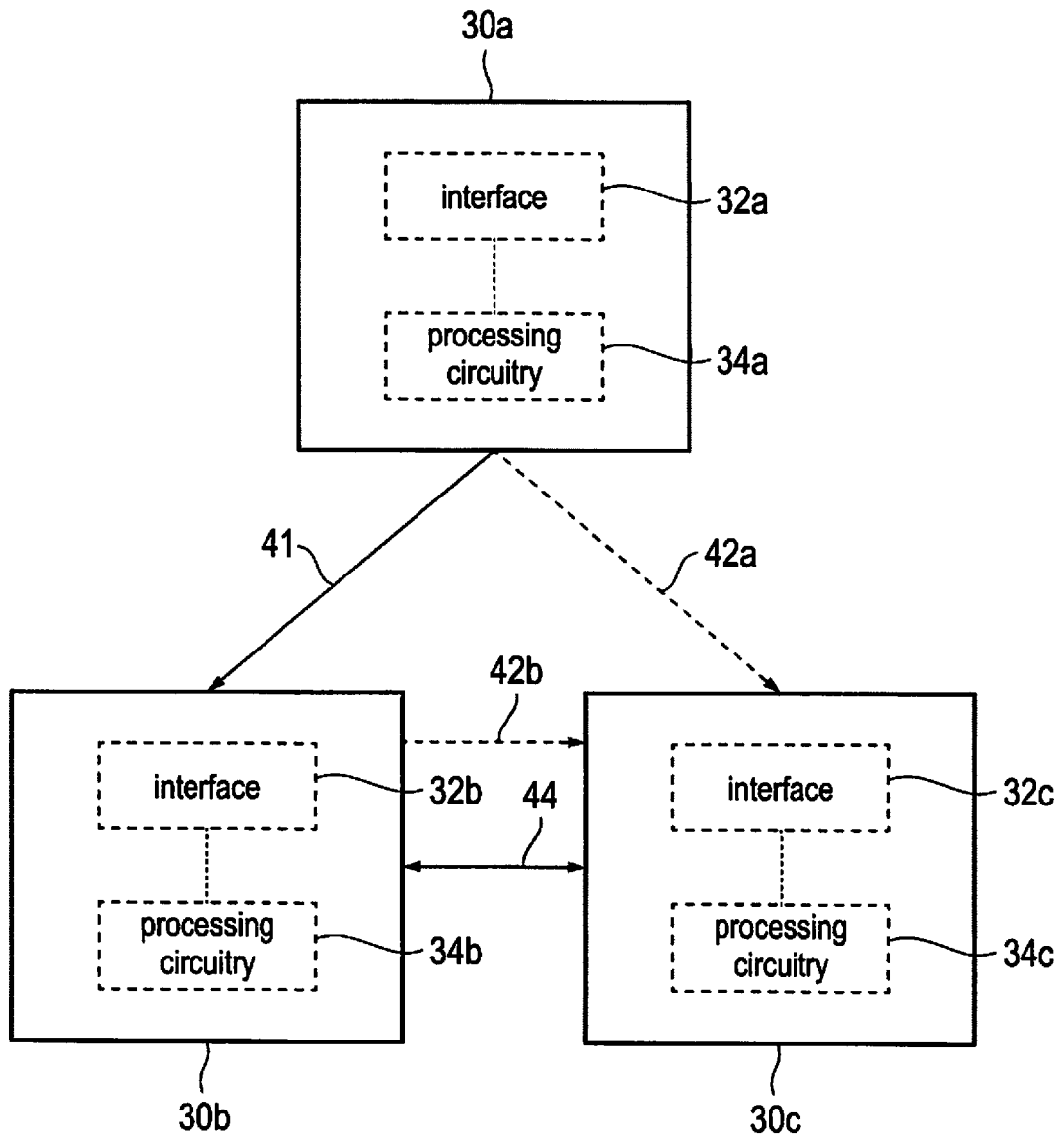
FIG. 4 shows a block diagram of a mobile communication system.

The development of 5G has brought increased attention to the automotive industry as a vertical manufacturer expected to leverage the most advanced features of the new generation of wireless communications. Among the main novelties of 5G, a wide range of spectrum possibilities (currently licensed up to the 28 GHz band—the first-ever Millimeter wave band for mobile use), enhanced support for high mobility scenarios and new mechanisms to guarantee and predict the experienced Quality of Service (QoS), have been established as key functions to support an increasingly connected transportation ecosystem. Besides, the latest standard release (Rel. 16) has given support to Vehicle-to-Everything (V2X) communications with New Radio (NR) technology, allegedly allowing transportation vehicles to make use of the same spectrum options, even for Vehicle-to-Vehicle (V2V) use cases.

Providing the NR support of V2X, transportation vehicles are also capable of communicating at frequencies above 6

2

GHz. In 5G, these higher frequency bands are allocated at the mmWave range of the spectrum (30-300 GHz). The use of higher frequency bands in communications implies propagating in a harsher channel, where the free-space path loss scales with ($f^2$), and shading by obstacles and atmospheric effects (e.g., water vapor and oxygen absorption, or rain) take a non-negligible role. Services relying on higher frequency systems, with their inherently high channel-induced attenuation, might find challenging to deliver satisfactory QoS in some situations where signal power attenuation is increased, lowering the received Signal-to-Noise Ratio. As a result, 5G User Equipment (UE) is reliant on multi-antenna front ends to perform beamforming and focus the radiate power towards the intended transmitter/receiver. It is thus worth considering that transportation vehicles may be equipped with an advanced multi-antenna system.

U.S. Pat. No. 11,102,728 B2 discloses a device for a wireless communication system, and a computer readable storage medium. The device comprises a processing circuit. The processing circuit is configured to acquire the current three-dimensional spatial location of a user equipment and determine a resource for the user equipment according to information showing a mapping relationship at least between three-dimensional spatial regions and resources.

U.S. Pat. No. 10,313,839 B2 discloses a method for allocating resources for D2D communication by a User Equipment (UE). The method includes identifying a movement direction of the UE and selecting a resource pool mapped to the identified movement direction among resources pools allocated according to movement direction. Further, the method comprises performing D2D communication using the selected resource pool.

U.S. Pat. No. 9,998,191 B2 discloses a communication control apparatus including an acquisition unit configured to acquire cell identification information assigned to an individual three-dimensional beam formed by a directional antenna capable of forming a three-dimensional beam and a control unit. The control unit is configured to control transmission of a reference signal performed using the individual three-dimensional beam, on the basis of the cell identification information. The control unit controls the transmission so that the reference signal is transmitted in a limited portion of available resource blocks.

US 2021/045067 A1 discloses a functional configuration of an apparatus on a base station side in a wireless communication system. The apparatus comprises a control unit to allocate a predetermined number of resources for each three-dimensional spatial region. Further, the control unit may be configured to control for each three-dimensional spatial region a base station.

US 2020/275455 A1 disclose that a device receives network condition information. The network condition information is indicative of network resource availability at a plurality of locations. The device processes the network condition information to associate network resource availability identified in the network condition information with one or more airspace voxels that represent one or more three-dimensional (3D) portions of airspace corresponding to the plurality of locations. The device receives flight parameters relating to a proposed flight plan of an unmanned aerial vehicle (UAV) through airspace represented by a set of airspace voxels, and network performance parameters associated with the proposed flight plan. The device determines that the network resource availability that is associated with the set of airspace voxels fails to satisfy the network performance parameters, and performs one or more actions to enable the UAV to access network resources that satisfy the network performance parameters.

Another potential vertical industry expected to get full benefit of both Device-to-Device (D2D) communications and the 5G network is the field of Aerial Systems (AS)— e.g., Manned Aerial Vehicles or Unmanned Aerial Vehicles (UAVs). These devices are expected to populate urban and rural air space to provide services such as sensing or emergency support, and thus will potentially require high performance communication capabilities to comply with urgent or data-hungry service needs. As such, AS might also rely of multi-antenna systems to support the foreseen throughput demand.

When using directive antennas instead of omnidirectional antennas, undesired radiation towards a wide region in (angular) space is minimized and thus interference exerted towards other users can be potentially reduced. This can enhance the rate of time and frequency resource reuse and increase the Quality of Service of the links. However, this paradigm requires increased knowledge by all nodes or at least one node (e.g., base station) that can intelligently manage these resources. As the radiation from nodes shifts from omnidirectional to beam-based, the footprint of the antenna patterns projected in space is a resource to plausible to work with, and it is thus worth considering that space itself might also be allocated in the scheduling strategies for future communications.

It is therefore a finding that a communication between a first communication device and a second communication device can be controlled by allocating a radiation boundary volume to the first communication device, which is used by the first communication device to communicate with the second communication device, e.g., with an AS acting as relaying system for communication with a network entity. This way, volume in an environment can be used more efficiently, e.g., by allocating and/or maintaining radiation boundary volumes for different communication devices, stacking radiation boundary volumes, etc. Thus, an interference between different communication devices may be reduced and/or a performance of a mobile communication system may be improved.

Examples provide a method for a network entity for controlling a communication between a first communication device and a second communication device. The method comprises obtaining positions of a plurality of communication devices and determining a plurality of radiation boundary volumes in an environment of the plurality of communication devices based on the positions. Each radiation boundary volume comprises a horizontal layer. Further, the method comprises allocating the radiation boundary volume of the plurality of radiation boundary volumes to the first communication device of the plurality of communication devices to communicate with the second communication device of the plurality of communication devices and transmitting information about the allocated radiation boundary volume to at least one of the first communication device and the second communication device. Thus, the network entity may allocate a radiation boundary volume, which can be used for communication with the second communication device by the first communication device. This way, resources for communication, e.g., a space, frequency, time, etc. can be assigned to different communication devices, which may increase an overall performance in a mobile communication system since a plurality of communication devices may receive allocated radiation boundary volumes from the same network entity. Further, by assigning a radiation boundary volume an AS can be involved in the communication, e.g., the AS may be the second communication device acting as relaying system.

In an example, a height of the horizontal layer of the radiation boundary volume may depend on an area above the ground (azimuthal expansion) of the radiation boundary volume. This way, the height of the horizontal layer may be adjusted corresponding to a density of communication devices and/or a azimuthal expansion of the radiation boundary volume.

In an example, the second communication device may be assigned to the first communication device to act as a relaying system for the first communication device. This way, a communication of the first communication device with a further communication device, e.g., a network entity, can be improved, e.g., the second communication device may act as AS.

In an example, the method may further comprise obtaining information about a movement of at least one of the first communication device and the second communication device and allocating at least one radiation boundary volume of the plurality of radiation boundary volumes to the first communication device based on the obtained information about the movement. This way, a usage of the at least one radiation boundary volume can be adjusted to the movement of the first communication device and/or the second communication device.

In an example, a time resource may be different for each allocated radiation boundary volume of the plurality of allocated radiation boundary volumes. This way, a blocking of a radiation boundary volume of the plurality of radiation boundary volumes allocated to the first communication device and/or second communication device can be reduced.

In an example, the method may further comprise reobtaining the positions of the plurality of communication devices and adapting the radiation boundary volume based on the reobtained position of the plurality of communication devices. This way, the allocated radiation boundary volume can be maintained in an improved way.

In an example, the method may further comprise monitoring a number of the plurality of communication devices and if the number of the plurality of communication devices has changed adapting the radiation boundary volume based on the number of the plurality of communication devices. This way, e.g., a size of the radiation boundary volume can be adjusted to the plurality of communication device. For example, for a smaller number of the plurality of communication devices the radiation boundary volume may be increased, since a likelihood of interference may be decreased by the smaller number.

In an example, the method may further comprise allocating at least one of a frequency resource and a time resource for each radiation boundary volume of the plurality of radiation boundary volumes. This way, it can be ensured that the communication between the first communication device and the second communication device can be performed using the frequency resource and/or time resource without or with decreased interference caused by other communication device using the same frequency resource and/or time resource.

In an example, each radiation boundary volume may have at least one of its own frequency resource pool and time resource pool. This way, the first communication device and the second communication device can determine a preferred frequency resource and/or time resource for communication.

Examples relates to a method for a first communication device for controlling a communication between the first communication device and a second communication device, comprising receiving from a controlling network entity information about a radiation boundary volume to communicate with the second communication device at the first communication device and communicating with the second communication device using the radiation boundary volume. This way, resources for communication, e.g., a space, frequency, time, etc. can be assigned to different communication devices, which may increase the overall performance since a plurality of communication devices may receive allocated radiation boundary volumes from the same controlling network entity.

In an example, the method may further comprise transmitting information about the radiation boundary volume to the second communication device. This way, the second communication device can be informed about the radiation boundary volume, e.g., if no line-of-sight (LOS) connection with the controlling network entity is possible.

Examples relates to a method for controlling a communication between a first communication device and a second communication device. The method comprises receiving from the first communication device information about a radiation boundary volume to communicate with the first communication device at the second communication device and communicating with the first communication device using the radiation boundary volume. This way, the second communication device can be informed about the radiation boundary volume, e.g., if no line-of-sight LOS connection with the controlling network entity is possible.

Examples further provide an apparatus, comprising one or more interfaces configured to communicate with a communication device or user equipment. The apparatus further comprises processing circuitry configured to control the one or more interfaces and to perform the method for user equipment and/or a communication device described above.

Examples further provide a transportation vehicle comprising the apparatus as described above.

Examples further relate to a computer program having a program code for performing the method described above, when the computer program is executed on a computer, a processor, or a programmable hardware component.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, e.g., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, operations, processes, elements, components and/or a group thereof, but do not exclude the presence or addition of one or more other features, integers, operations, processes, elements, components and/or a group thereof.

FIG. 1 shows an example of a method 100 for a network entity for controlling a communication between a first communication device and a second communication device. The method 100 comprises obtaining 110 positions of a plurality of communication devices and determining 120 a plurality of radiation boundary volumes in an environment of the plurality of communication devices based on the positions. Each radiation boundary volume comprises a horizontal layer. Further, the method 100 comprises allocating 130 the radiation boundary volume of the plurality of radiation boundary volumes to the first communication device of the plurality of communication devices to communicate with the second communication device of the plurality of communication devices and transmitting 140 information about the allocated radiation boundary volume to at least one of the first communication device and the second communication device. Thus, the network entity can inform the first communication device and/or the second communication device about a radiation boundary volume, which may improve a communication in a mobile communication system, e.g., by reducing interference.

The first/second communication device may communicate in a mobile communication system with the network entity, e.g., a base station. For example, the first/second communication device and the network entity may communicate in/via a mobile communication system. The mobile communication system may comprise a plurality of transmission points and/or base stations operable to communicate radio signals with the first/second communication device. In an example, the mobile communication system may comprise the first/second communication device and the network entity.

A network entity, e.g., the network entity, can be located in the fixed or stationary part of the network or system. A network entity may correspond to a remote radio head, a transmission point, an access point, a macro cell, a small cell, a micro cell, a pico cell, a femto cell, a metro cell etc. The term small cell may refer to any cell smaller than a macro cell, e.g., a micro cell, a pico cell, a femto cell, or a metro cell. Moreover, a femto cell is considered smaller than a pico cell, which is considered smaller than a micro cell. A network entity can be a wireless interface of a wired network, which enables transmission and reception of radio signals to a communication device. Such a radio signal may comply with radio signals as, for example, standardized by 3GPP or, generally, in line with one or more of the above listed systems. Thus, a network entity may correspond to a NodeB, an eNodeB, a BTS, an access point, etc.

The second communication device may act as relaying system. A relaying system may correspond to an intermediate network node in the communication path between a communication device, e.g., the network entity and the first communication device. The relaying system may forward a signal received from the first communication device to the network entity, signals received from the network entity to the first communication device, respectively.

The mobile communication system may be cellular. The term cell refers to a coverage area of radio services provided by a transmission point, a remote unit, a remote head, a remote radio head, communication device, network entity or a NodeB, an eNodeB, respectively. The terms cell and base station may be used synonymously. A wireless communication device, e.g., the first/second communication device, can be registered or associated with at least one cell (e.g., the network entity), e.g., it can be associated to a cell such that data can be exchanged between the network and the mobile in the coverage area of the associated cell using a dedicated channel, connection or connection.

In general, the first/second communication device is a device that is capable of communicating wirelessly. In particular, however, the first/second communication device may be a mobile communication device, e.g., a communication device that is suitable for being carried around by a user. For example, the first/second communication device may be a User Terminal (UT) or User Equipment (UE) within the meaning of the respective communication standards being used for mobile communication. For example, the first/second communication device may be a mobile phone, such as a smartphone, or another type of mobile communication device, such as a smartwatch, a laptop computer, a tablet computer, or autonomous augmented-reality glasses. For example, the first/second communication device may be an AS. For example, the first/second communication device and the network entity may be configured to communicate in a cellular mobile communication system. Accordingly the first/second communication device and the network entity may be configured to communicate in a cellular mobile communication system, for example, in a Sub-6 GHz-based cellular mobile communication system (covering frequency bands between 500 MHz and 6 GHz) or in a mmWave-based cellular mobile communication system (covering frequency bands between 20 GHz and 60 GHz). For example, the first/second communication device and the network entity may be configured to communicate in a mobile communication system/cellular mobile communication system. In general, the mobile communication system may, for example, correspond to one of the Third Generation Partnership Project (3GPP)-standardized mobile communication networks, where the term mobile communication system is used synonymously to mobile communication network. The mobile communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In addition the first/second communication device/network entity may be suitable for, or configured to, communicating/communicate via non-cellular communication systems, e.g., via a device-to-device vehicular communication system, e.g., according to the IEEE 802.11p standard (Institute of Electrical and Electronics Engineers standard 802.11p for vehicular communication) or via a wireless local area network (e.g., according to IEEE 802.11a, IEEE 802.11b, IEEE 802.11g, IEEE 802.11n, IEEE 802.11ac or IEEE 802.11ax, also known as Wi-Fi 1 through Wi-Fi 6(E)). In particular, the first/second communication device and the network entity may be suitable for, or configured to, communicating/communicate in the frequency band between 5 GHz and 7.1 GHz, which covers communication in the 5 GHz band (for WiFi in the 5 GHz band), 5.9 GHz band (for vehicular communication according to the 802.11p standard) and between 5.9 GHz and 7.1 GHz (for WiFi in the 6 GHz band).

A connection between the first/second communication device and the network entity and/or the first communication device and the second communication device may be a wireless connection, e.g., a mmWave-based connection over the mobile communication system (e.g., using carrier frequencies of at least 20 GHz) or may be performed at lower carrier frequencies, e.g., using carrier frequencies of at most 7.5 GHz. For example, the wireless connection between the first/second communication device and the network entity may be initiated using the protocols of the mobile communication system, or using a short-range communication system, such as via a wireless local area network outlined above.

As is evident from the above example, while the communication between first/second communication device and network entity and/or between first communication device and second communication device occurs via the mobile communication system, additional communication and/or alternatively communication (e.g., the first and/or the second communication device may be a transportation vehicle or may be comprised by a transportation vehicle or may an AS or may be comprised by an AS) between the first communication device and the second communication device may occur via a vehicular communication system. Such communication may be carried out directly, e.g., by use of Device-to-Device (D2D) communication. Such communication may be carried out using the specifications of the vehicular communication system. An example of D2D is direct communication between transportation vehicles, also referred to as Vehicle-to-Vehicle communication (V2V) or Vehicle-to-Everything (V2X), car-to-car, Dedicated Short Range Communication (DSRC), respectively. Technologies enabling such D2D-communication include 802.11p, 3GPP systems (4G, 5G, NR and beyond), etc. For example, the first communication device may be a transportation vehicle and the second communication device may be drone, both communicating, for example, via V2V messages.

The radiation boundary volume may be a volume in the environment which is used for communication between the first communication device and the second communication device. As described the radiation boundary comprises a horizontal layer. For example, multiple radiation boundary volumes can be stacked, differing in the horizontal layer, and occupying the same area above the ground. Thus, a plurality of communication devices can use different communication channels to communicate with each other utilizing multiple radiation boundary volumes using the same area above the ground. For example, the horizontal layer may have a finite height (expansion in a direction perpendicular to the ground). For example, the area above ground (azimuthal expansion) of a radiation boundary volume may vary for each horizontal layer and/or with one horizontal layer. For example, a horizontal layer may comprise radiation boundary volumes with different azimuthal expansions.

For example, a radiation energy density caused by the first communication device and/or the second communication device may be outside the radiation boundary volume below a threshold, e.g., below a maximal allowed background radiation energy density which may not influence the communication of other communication devices outside the radiation boundary volume. This way, interference between different communication device can be reduced. For example, a radiation energy density of a transmission of the first communication device and the second communication device used for communication between both communication devices can be neglected outside of the radiation boundary volume.

Obtaining 110 positions of the plurality of communication devices may be performed by receiving information about the positions, e.g., from the first communication device, and/or by determining information about the positions. For example, the network entity may use a wide variety of sensor data types, including radar sensor data and lidar sensor data, but also, e.g., vision-related sensors such as camera and IR sensors, as well as ultrasound sensors to determine the positions of the plurality of communication devices. Optionally or alternatively, the positions of the plurality of communication devices may be determined by a used radio communication connection between the network entity and each communication device of the plurality of communication devices, e.g., using relative-strength-index, angle of arrival, etc.

Determining 120 the plurality of radiation boundary volumes can be performed by a processing unit of the network entity. For example, the network entity may divide a volume, e.g., a coverage volume or a volume of interest (e.g., a traffic crossing) of the network entity into the plurality of radiation boundary volumes. Alternatively, the network entity may divide the volume into a plurality of tiles and may generate the radiation boundary volume by assigning at least one tile to each radiation boundary of the plurality of radiation boundary volumes. Thus, the network entity can manage the communication between the plurality of communication devices in its coverage area, which may increase a performance of a mobile communication system comprising the network entity and the plurality of communication devices.

Allocating 130 the radiation boundary volume to the first communication device may be done by the processing unit of the network entity. For example, the allocate radiation boundary volume may enable the first communication device to communicate with the second communication devices without using another radiation boundary volume. For example, the radiation boundary volume may be formed by a plurality of tiles (defining the area above ground/azimuthal expansion), e.g., if a distance between the first communication device and the second communication device is greater than a length (of the azimuthal expansion) or height (of the horizontal layer) of the tile of the plurality of tiles. Thus, the first communication device may communicate with the second communication device via a radiation boundary volume, which may consist of at least one tile.

Transmitting 140 the information about the allocated radiation boundary volume to at least one of the first communication device and the second communication device can be performed by any suitable message, e.g., by a broadcast message, groupcast message or unicast message. Thus, the information about the allocated radiation boundary volume can be transmitted in a desired way, e.g., using a broadcast message to transmit the information about the allocated radiation boundary volume to the communication device. For example, if the network entity is a transportation vehicle or infrastructure (such like a traffic light, etc.) and the first communication device is another transportation vehicle the information about the allocated radiation boundary volume may be transmitted via V2X communication.

In an example, a height of the horizontal layer of the radiation boundary volume may depend on an area above the ground of the radiation boundary volume. For example, a volume of the radiation boundary volume may be constant. Thus, if the area above the ground of the radiation boundary volume is decreased, the height of the horizontal layer may be increased.

In an example, a height of the horizontal layer may depend on a distance between the first communication device and the second communication device. For example, the second communication device may be an AS, positioned above the first communication device, e.g., a transportation vehicle. Thus, the height of the horizontal layer may be at least the distance between the first communication device and the second communication device, such that both can communicate with each other using the radiation boundary volume.

For example, determining 120 the plurality of radiation boundary volumes may be based on the distance between the first communication device and the second communication device. This way, the network entity can determine a radiation boundary volume enabling the first communication device and the second communication device to communicate directly using the radiation boundary volume.

In an example, the second communication device may be assigned to the first communication device to act as a relaying system for the first communication device. For example, the second communication device may be an AS. Thus, the second communication device can maintain a relative position to the first communication device, e.g., directly above the first communication device, in a certain distance, etc. This way, the second communication device can provide a relay service for the first communication device, e.g., in a downtown area (partially) blocking a line-of-sight path between the first communication device and the network entity. Further, a data traffic directly above the ground can be reduced by communicating in a horizontal layer in an increased distance to the ground.

For example, ground and aerial communication devices may communicate in a D2D state. For instance, AS, such like drones, can communicate with transportation vehicles and vice versa. For example, a drone, e.g., the second communication device, can be assigned to at least one transportation vehicle, e.g., the first communication device. However, ungoverned radiation over the 3D space (e.g., a coverage volume of the network entity) by each communication device of the plurality of communication devices may quickly become unwieldy for channel congestion. By determining 120 and allocating 130 radiation boundary volumes interference effects may be reduced or even omitted.

In an example, the method may further comprise obtaining information about a movement of at least one of the first communication device and the second communication device and allocating at least one radiation boundary volume of the plurality of radiation boundary volumes to the first communication device based on the obtained information about the movement. For example, the network entity may allocate a plurality of radiation boundary volumes to the first communication device and the second communication device to ensure a communication between both for a predefined time, e.g., a time needed for a download of requested data. Optionally, the radiation boundary volume allocated to the first communication device and/or the second communication device may depend on the movement of the first communication device and/or the second communication, e.g., the radiation boundary volume may be allocated for a certain time.

In an example, a time resource may be different for each allocated radiation boundary volume of the plurality of allocated radiation boundary volumes. Thus, a radiation boundary volume of the plurality of radiation boundary volumes can be released for another communication device, e.g., if the first communication device has moved away from the radiation boundary volume. This way, the radiation boundary volume can be released depending on the movement of the first communication device and/or the second communication device.

In an example, the method may further comprise reobtaining the positions of the plurality of communication devices and adapting the radiation boundary volume based on the reobtained position of the plurality of communication devices. For example, the other communication device in a surrounding of the first communication device may have moved away. Thus, a radiation boundary volume allocated to the first communication device can be increased, because interference with the other communication device may be decreased.

In an example, the method may further comprise monitoring a number of the plurality of communication devices and if the number of the plurality of communication devices has changed adapting the radiation boundary volume based on the number of the plurality of communication devices. Thus, for a higher density of communication devices a size, especially an azimuthal expansion, of the radiation boundary volume may be decreased. For example, in a first horizontal layer directly above the ground a density of communication devices (e.g., transportation vehicles, smartphones, etc.) may be higher as in a second horizontal layer above the first horizontal layer (e.g., used by AS). Thus, the radiation boundary volume comprising the first horizontal layer may comprise a smaller azimuthal expansion as the radiation boundary volume comprising the second horizontal layer.

For example, in an open landscape with a low number of communication devices a size of a radiation boundary volume may be increased, e.g., to ease a determination of the plurality of radiation boundary volume or to enable a greater variety of antenna configuration which can be used by the first and/or second communication device using this radiation boundary volumes. For example, in a downtown area with a higher number of communication device a size of a radiation boundary volume may be decreased to ensure that each communication device of the plurality of communication device (e.g., the first communication device) may have enough radiation boundary volumes to communicate with a desired other communication device (e.g., the second communication device). This way, an interference caused by the first communication device outside the radiation boundary volume can be reduced, since the radiation energy density outside of the radiation boundary volume can be neglected.

In an example, the method may further comprise allocating at least one of a frequency resource and a time resource for each radiation boundary volume of the plurality of radiation boundary volumes. This way, it can be ensured that the communication between the first communication device and the second communication device can be performed using the frequency resource and/or time resource without or with decreased interference caused by other communication device using the same frequency resource and/or time resource.

In an example, each radiation boundary volume may have at least one of its own frequency resource pool and time resource pool. This way, the first communication device and the second communication device can determine a preferred frequency resource and/or time resource for communication.

In an example, the plurality of radiation boundary volumes may be determined 120 based on a structured grid. For example, the structured grid can be hexagonal, triangular (geodesic grid), rectangular, or any shape that can uniformly fill space. This way, a computational effort for generating the plurality of radiation boundary volumes (comprising a plurality of tiles) can be reduced.

In an example, the plurality of radiation boundary volumes and/or the plurality of tiles may be determined 120 based on an antenna capability of the first communication device and/or the second communication device. This way, it can be ensured that the radiation boundary volume/tiles can be used in a proper way by the first communication device and/or the second communication device. For example, the first and/or the second communication device may transmit an antenna capability to the network entity, to inform the network entity about possible radiation pattern that can be generated with an antenna system. Thus, the network entity can determine a shape for the plurality of radiation boundary volumes/plurality of tiles which matches a shape of an adjustable radiation pattern of the first and/or second communication device.

More details and features are mentioned in connection with the embodiments described above and/or below. The example shown in FIG. 1 may comprise one or more optional additional features corresponding to one or more facets mentioned in connection with the proposed concept or one or more examples described below (e.g., FIG. 2-7).

FIG. 2 shows an example of a method 200 for a first communication device. The method 200 for the first communication device for controlling a communication between the first communication device and a second communication device comprises receiving 210 from a controlling network entity information about a radiation boundary volume to communicate with the second communication device at the first communication device and communicating 220 with the second communication device using the radiation boundary volume. This way, the first communication device is enabled to communicate with the second communication with an allocated radiation boundary volume, which may improve a performance of the mobile communication system.

The controlling network entity may be the network entity as described with reference to FIG. 1, e.g., the first communication device may be a counterpart to the network entity described with reference to FIG. 1. For example, the first communication device may be UE, a transportation vehicle, etc.

In an example, the method 200 may further comprise transmitting information about the radiation boundary volume to the second communication device. This way, the second communication device can be informed about the radiation boundary volume which shall be used for communication with the first communication device. For example, if the first and the second communication device are transportation vehicles the information may be transmitted by a Wireless Local Area Network (WLAN) technology and may work directly between vehicle and vehicle (V2V), which form a vehicular ad-hoc network as two V2X senders come within each other's range. Messages like Cooperative Awareness Messages (CAM) or Basic Safety Message (BSM) and Decentralized Environmental Notification Messages (DENM) may be used for communication between the transportation vehicles. For example, if the second communication device may be an AS, the first communication device may use D2D or V2X-messages to transmit information about the radiation boundary volume to the second communication device.

In an example, the method 200 may further comprise receiving from the controlling network entity information about a radiation boundary volume for the second communication device and transmitting information about the received radiation boundary volume of the second communication device to the second communication device. This way, the second communication can be informed about an allocated radiation boundary volume even if no connection between the controlling network entity and the second communication device is established/possible using the first communication device, e.g., as a relaying system.

More details and features are mentioned in connection with the embodiments described above and/or below. The example shown in FIG. 2 may comprise one or more optional additional features corresponding to one or more facets mentioned in connection with the proposed concept or one or more examples described above (FIG. 1) and/or below (e.g., FIG. 3-7).

FIG. 3 shows an example of a method 300 for a second communication device. The method 300 for controlling a communication between a first communication device and a second communication device comprises receiving 310 from the first communication device information about a radiation boundary volume to communicate with the first communication device at the second communication device and communicating 320 with the first communication device using the radiation boundary volume. This way, the second communication device can be informed about an allocated radiation boundary volume even if the second communication device has no connection to a controlling network entity (e.g., the network entity as described with reference to FIG. 1). For example, the second communication device may communicate with the first communication device as described with reference to FIG. 2. For example, the second communication device may be an AS and may act as relaying system for the first communication device. By using an AS blocking, e.g., caused by building in a downtown area can be bypassed by the AS using a horizontal layer in a greater distance to the ground.

More details and features are mentioned in connection with the embodiments described above and/or below. The example shown in FIG. 3 may comprise one or more optional additional features corresponding to one or more facets mentioned in connection with the proposed concept or one or more examples described above (FIG. 1-2) and/or below (e.g., FIG. 4-7).

FIG. 4 shows a block diagram of a mobile communication system. The mobile communication system comprises three apparatuses 30a, 30b, 30c. Each apparatus 30a, 30b, 30c comprises one or more interfaces 32a, 32b, 32c configured to communicate with the first communication device, the second communication device and/or the network entity. Each apparatus 30a, 30b, 30c further comprises processing circuitry 34a, 34b, 34c configured to control the one or more interfaces and to perform the method for the network entity 30a as described above (e.g., described with reference to FIG. 1), the method for the first communication device 30b as described above (e.g., described with reference to FIG. 2) and/or the method for the second communication device 30c as described above (e.g., described with reference to FIG. 3).

The network entity 30a may be communicatively coupled to the first communication device 30b. The network entity 30a may allocate a radiation boundary volume to the first communication device 30b and may transmit 41 information about the allocated radiation boundary volume to the first communication device 30b. Optionally, the network entity 30a may be communicatively coupled to the second communication device 30b and may transmit 42a information about the allocated radiation boundary volume to the second communication device 30c. Alternatively, the first communication device 30b may transmit 42b information about the allocated radiation boundary volume to the second communication device 30c. The first communication device 30b and the second communication device 30c may communicate 44 with each other using the allocated radiation boundary volume.

For example, the apparatus 30a, 30b, 30c can be comprised by a transportation vehicle, an AS, a smartphone, an infrastructure, etc. For example, the transportation vehicle may be a land vehicle, such a road vehicle, a car, an automobile, an off-road vehicle, a motor vehicle, a bus, a robo-taxi, a van, a truck or a lorry. Alternatively, the transportation vehicle may be any other type of transportation vehicle, such as a train, a subway train, a boat or a ship. For example, the proposed concept may be applied to public transportation (trains, bus) and future methods or mechanisms of mobility (e.g., robo-taxis).

As shown in FIG. 4 the respective one or more interfaces 32a, 32b, 32c are coupled to the respective processing circuitry 34a, 34b, 34c at the apparatus 30a, 30b, 30c. In examples the processing circuitry 34a, 34b, 34c may be implemented using one or more processing units, one or more processing devices, any method or mechanism for processing, such as a processor, a computer or a programmable hardware component being operable with accordingly adapted software. Similar, the described functions of the processing circuitry 34a, 34b, 34c may as well be implemented in software, which is then executed on one or more programmable hardware components. Such hardware components may comprise a general-purpose processor, a Digital Signal Processor (DSP), a micro-controller, etc. The processing circuitry 34a, 34b, 34c is capable of controlling the interface 32a, 32b, 32c, so that any data transfer that occurs over the interface and/or any interaction in which the interface may be involved may be controlled by the processing circuitry 34a, 34b, 34c. For example, the apparatus 30a, 30b, 30c can be comprised by a transportation vehicle. For example, the transportation vehicle may be a land vehicle, such a road vehicle, a car, an automobile, an off-road vehicle, a motor vehicle, a bus, a robo-taxi, a van, a truck or a lorry. Alternatively, the transportation vehicle may be any other type of transportation vehicle, such as a train, a subway train, a boat or a ship. For example, the proposed concept may be applied to public transportation (trains, bus) and future methods or mechanisms of mobility (e.g., robo-taxis).

In an exemplary embodiment the apparatus 30a, 30b, 30c may comprise a memory and at least one processing circuitry 34a, 34b, 34c operably coupled to the memory and configured to perform the below mentioned method.

In examples the one or more interfaces 32a, 32b, 32c may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, e.g., transmit or receive signals, information with further internal or external components. The one or more interfaces 32a, 32b, 32c may comprise further components to enable communication between transportation vehicles. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc.

More details and features are mentioned in connection with the embodiments described above and/or below. The example shown in FIG. 4 may comprise one or more optional additional features corresponding to one or more facets mentioned in connection with the proposed concept or one or more examples described above (FIG. 1-3) and/or below (e.g., FIG. 5-7).

Figure 5:
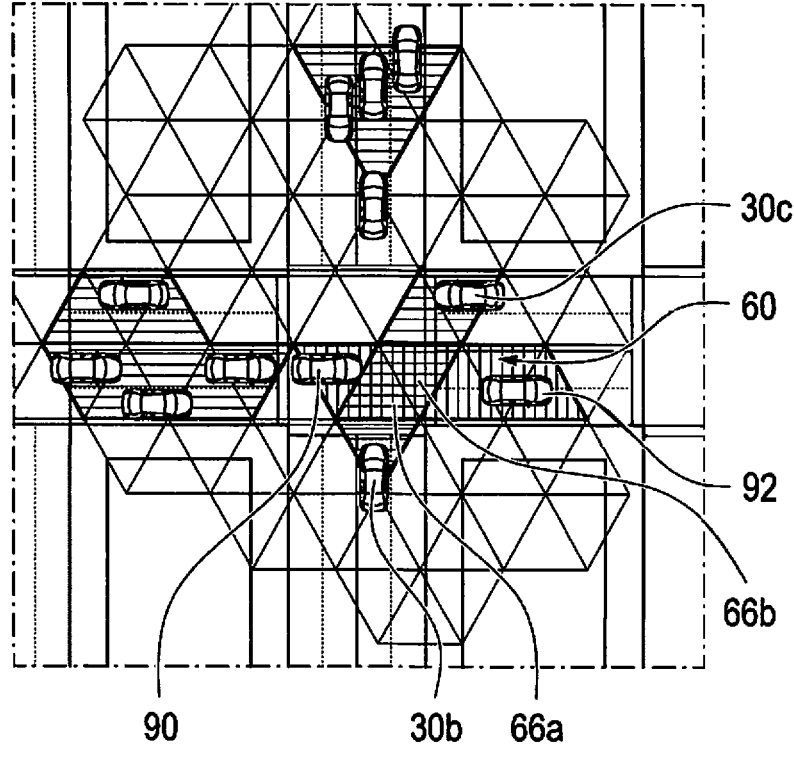
FIG. 5 shows an example for communication between a plurality of communication devices in 2D.

FIG. 5 shows an example for communication between a plurality of communication devices 30b, 30c, 90, 92 in 2D.

A base station (BS), e.g., the network entity described with reference to FIG. 1, may manage the scheduling and resource allocation of multiple communication devices 90, 92 communicating via Device-to-Device (D2D) (e.g., a sidelink) or even to infrastructure or the BS itself. Each communication device 90, 92 may be equipped with multi-element antenna systems capable of shaping, steering and tuning the directivity/beamwidth of the radiation pattern that they communicate with.

The BS may generate a grid consisting of a plurality of tiles (triangles in FIG. 5a, 5b). Further, the BS may allocate for certain communication devices 90, 92 a radiation boundary area 60, 66 (see the connected hatched triangles), e.g., a specific area in space based on an antenna footprint (or an angular region in space), determined by e.g., by power constraints, an antenna capability, etc. Further the BS may allocate a time resource (a time frame/slot) for communication using each radiation boundary area 60, 66. Further, the BS may allocate a frequency resource (e.g., a channel/subchannel) for communications using each radiation boundary area 60, 66.

As can be seen in FIG. 5 a tile 66a, 66b of a radiation boundary area 60, 66 can be allocated to different communication devices 30c, 30b, 90, 92. Both the radiation boundary area 60 for communication of the first communication device 30b with the second communication device 30c and the radiation boundary area 66 for communication of a third communication device 90 with a fourth communication device 92 may comprise the same tiles 66a, 66b. In this case, the same time resource and/or frequency resource (tile hatching vertical) may be allocated for different communication devices (both unicast and groupcast) across a space, e.g., the coverage area of the BS, for different radiation boundary areas 60 which does not overlap (does not comprise the same tiles 66a, 66b). The vertically hatched tiles represent the same time resource and/or frequency resource. When the radiation boundary areas 60, 66 comprises the same allocated tiles 66a, 66b for a given link, a different time resource and/or frequency resource may be given to the other radiation boundary area 66 (tile hatching horizontal). For example, tiles 66a, 66b can be allocated to both radiation boundary areas 60, 66 and thus the other radiation boundary area 66 may have a different time resource and/or frequency resource.

More details and features are mentioned in connection with the embodiments described above and/or below. The example shown in FIG. 5 may comprise one or more optional additional features corresponding to one or more facets mentioned in connection with the proposed concept or one or more examples described above (FIG. 1-4) and/or below (e.g., FIG. 6-7).

Figure 6:
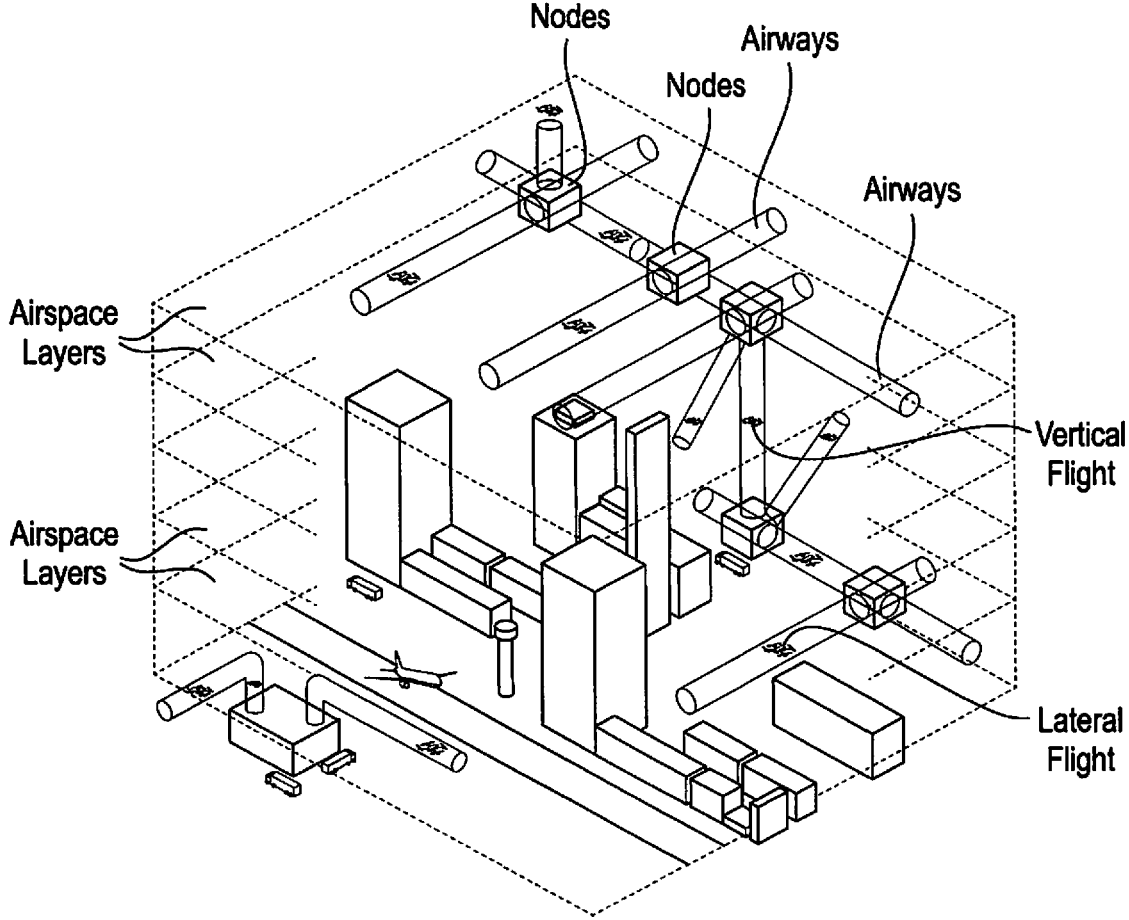
FIG. 6 shows an example for dividing a space in different radiation boundary volumes in 3D.

FIG. 6 shows an example for dividing a space in different radiation boundary volumes in 3D. The space may comprise different airspace layers, which can define the horizontal layer of the radiation boundary volumes. For reasons of simplification airways are only shown parallel or perpendicular to the airspace layers. Airways under any desired angle are possible to. The airways may be used by an AS, e.g., to follow a transportation vehicle (e.g., a lateral flight along a horizontal airway), to increase a signal intensity (e.g., a vertical flight along a vertical airway, e.g., to decrease interference or blocking), etc. The nodes shown in FIG. 6 may represent communication devices, e.g., AS.

More details and features are mentioned in connection with the embodiments described above and/or below. The example shown in FIG. 6 may comprise one or more optional additional features corresponding to one or more facets mentioned in connection with the proposed concept or one or more examples described above (FIG. 1-5) and/or below (e.g., FIG. 7).

FIG. 7 shows different examples for dividing a space in different radiation boundary volumes in 2D. The network entity described above, e.g., with reference to FIG. 1, may be configured to allocate space volume constraints (radiation boundary volumes) for a scheduled D2D (or V2X) communication when ground and/or aerial-based communication devices between each other. As can be seen the area above ground (azimuthal expansion) is for every figure subdivided into three different horizontal layers.

For example, a time-frequency resource may be allocated by use of a set of Physical Resource Blocks (PRBs) as described above, e.g., with reference to FIG. 5. For example, a volume region in space (a radiation boundary volume) may be allocated by using Spatial Resource Blocks (SRB). An SRB may comprise or may be defined by two subcomponents, an area above the ground (azimuthal expansion) and a horizontal layer.

For example, the radiation boundary volume may comprise or may consist of the azimuthal expansion and the horizontal layer.

The horizontal layers may subdivide a vertical space (compare the airspace layers in FIG. 6). Thus, determining the radiation boundary volume may comprise an assignation of one or more allocated horizontal layers. An example of this can be seen in airspace layers, as illustrated in FIG. 6, although any other type of vertical division into layers should also be possible.

The azimuthal expansion may subdivide a coverage area above the ground, e.g., the coverage area of controlling network entity. Thus, determining the radiation boundary volume may comprise an assignation of one or more allocated tiles in the 2D azimuthal expansion. An example of this can be any tessellation of the 2D plane (e.g., triangle, square, hexagon-based), as illustrated in FIG. 5, e.g., the allocation of a radiation boundary area. The radiation boundary area may be a part of the radiation boundary volume, e.g., an azimuthal expansion, and may define the area above the ground of the radiation boundary volume.

When a PRB, or similar time-frequency pool building block, is associated with a radiation boundary volume, time-frequency-space resource allocations are possible. For example, the same PRB can be assigned to two or more SRB in 2D, fostering time-frequency reuse for V2V, as illustrated in FIG. 5, or D2D between AS and transportation vehicles, as illustrated in FIG. 7.

Figure 7A:
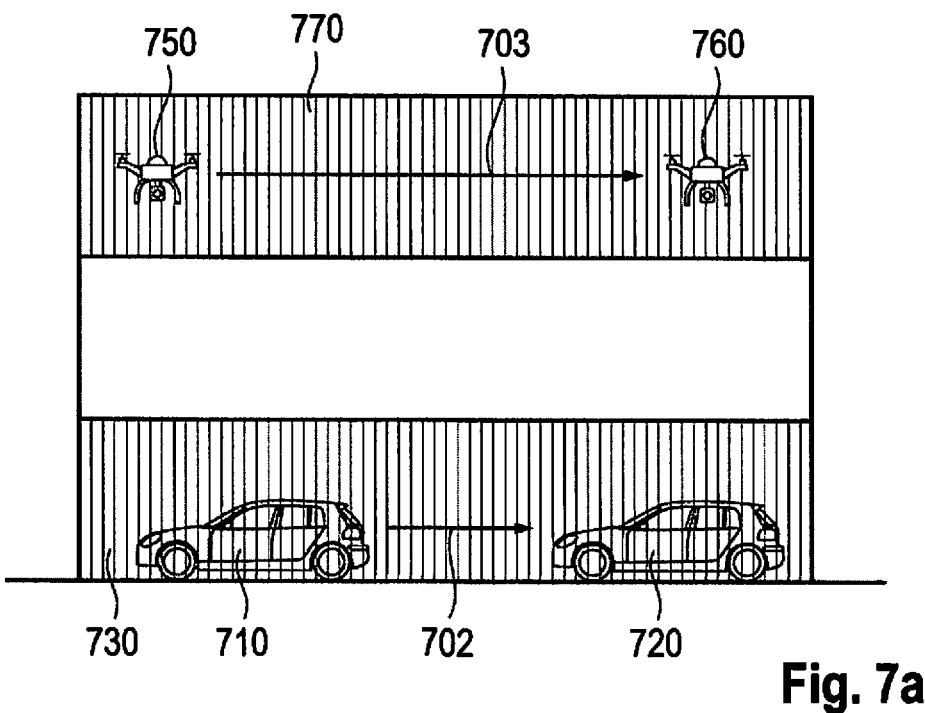
FIGS. 7a-d shows different examples for dividing a space in different radiation boundary volumes in 2D.
Figure 7B:
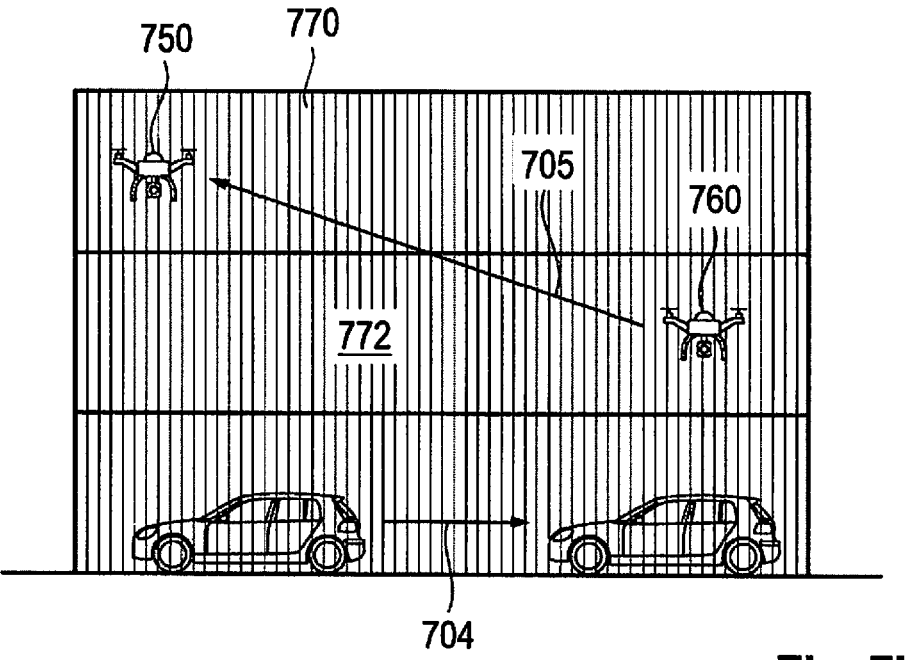
Figure 7C:
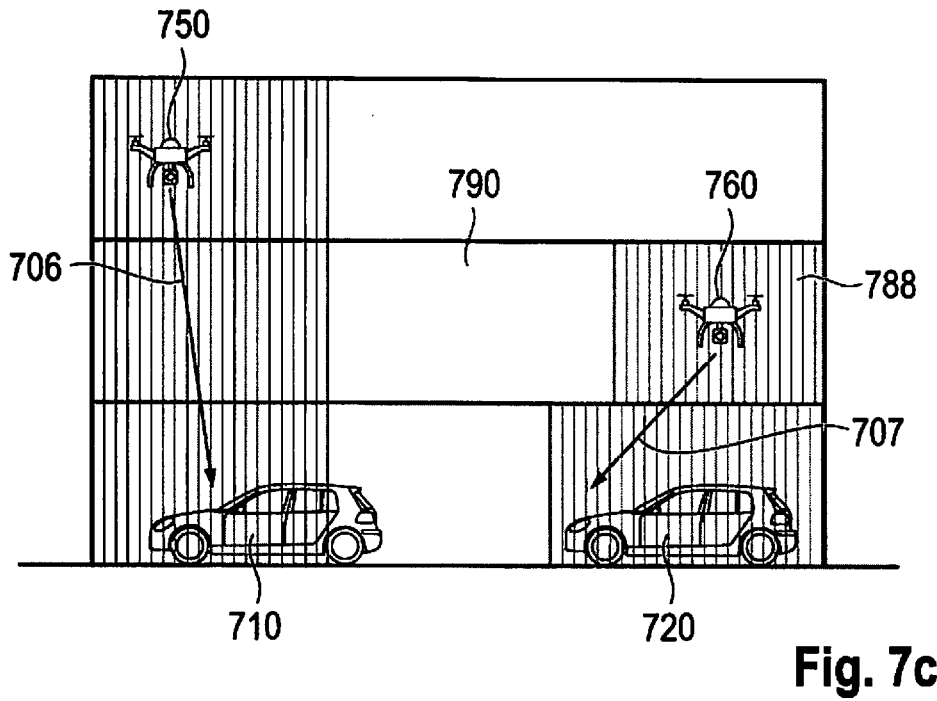
Figure 7D:
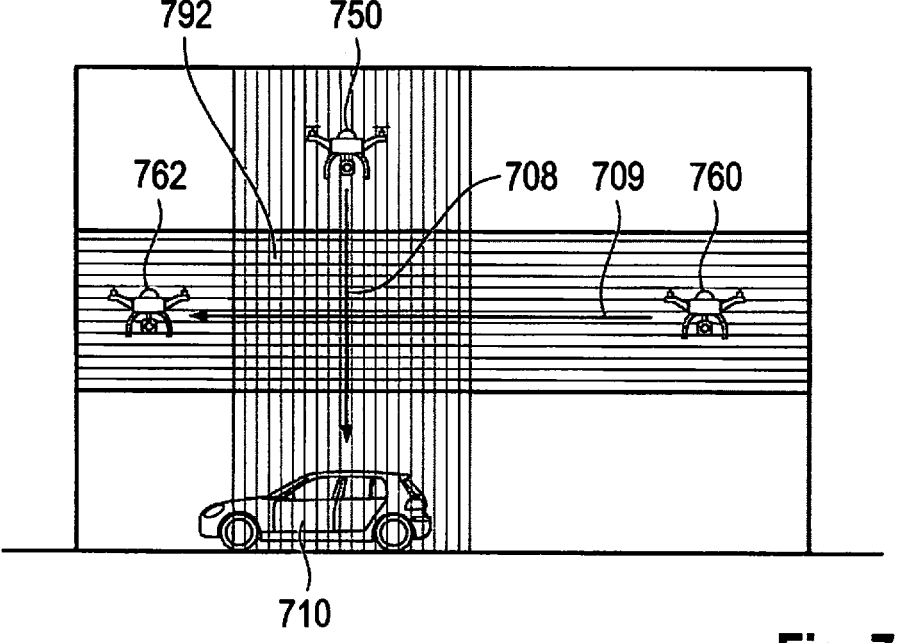

In another example, the same PRB set can be assigned to two or more SRB in 3D, promoting re-use across layers within the same azimuthal expansion, as illustrated in FIG. 7d.

As can be seen in FIG. 7a a transportation vehicle 710 (e.g., a first communication device) may communicate with another transportation vehicle 720 (e.g., a second communication device) utilizing a radiation boundary volume 730. In a horizontal layer with a greater distance to the ground two drones 750, 760 may communicate utilizing another radiation boundary volume 770. The radiation boundary volumes 730, 770 may have the same size, especially the same area above the ground (the same tile). A PRB may be associated to a V2V link 702 in a first SRB in the bottom horizontal layer and the same PRB may be associated to a drone-to-drone link 703 in a second SRB in top horizontal layer.

As can be seen in FIG. 7b the drones 750, 760 can also communicate utilizing a plurality of radiation boundary volumes 770, 772. This way, drones having a different distance to the ground still can communicate with each other. A PRB may be associated to a V2V link 704 in a first SRB in the bottom horizontal layer and the same PRB may be associated to a drone-to-drone link 705 in a second and a third SRB in the middle and the top horizontal layer.

As can be seen in FIG. 7c the allocated area above ground (tiles) may be different for different horizontal layer. For example, the radiation boundary volume in which the drone 760 is located may be smaller than the radiation boundary volume in which the transportation vehicle 720 is located. This way, the radiation boundary volume can be adjusted, e.g., to a density of communication devices. For example, the transportation vehicle 720 could use the radiation boundary volume 790 for communicating with the drone 750, since the radiation boundary volume 788 is decreased, enabling a line-of-sight communication between the transportation vehicle 720 and the drone 750 utilizing the radiation boundary volume 790. A PRB may be associated to a drone-to-vehicle link 706 in a first, second and third SRB in the bottom, middle and top horizontal layer and the same PRB may be associated to a drone-to-vehicle link 707 in a fourth and fifth SRB in bottom and middle horizontal layer.

The volume for each SRB may be constrained by a radiation density threshold, over which the radiation exerted by the transmitting communication device cannot be surpassed. In principle, the radiation density outside the SRB may be below a threshold such that interference with other communication signals can be reduced or even omitted.

As can be seen from FIG. 7d, when the operating radiation patterns of two independent links may be prone to cause interference or collision (e.g., by utilizing the same radiation boundary volume 792), the network entity can assign dynamically different PRB sets for the same radiation boundary volume to different communication devices. For example, as shown in FIG. 7d, the transportation vehicle 710 and the drone 750 may be assigned a first PRB (vertical hatching) and both drone 760, 762 may be assigned another different PRB (horizontal hatching). A first PRB may be associated to a drone-to-vehicle link 708 in a first, second and third SRB in the bottom, middle and top horizontal layer and a second PRB may be associated to a drone-to-drone link 709 in a fourth SRB in middle horizontal layer.

Further, the network entity may generate an SRB map (radiation boundary volume map). The SRB map can be global (common for all communication devices) or local (specific for the communication devices being managed).

The SRB may be changed in size to adapt to traffic and congestion and reduce computing needs.

The network entity may allocate a set of PRBs and associated SRBs to the communication devices/links it is serving. The network entity may make use of information such as expected trajectory or the purpose/service of the link to optimize allocation. For example, if an AS is assisting a ground transportation vehicle a moving 'prism' (SRB-wise) may be expected for the duration of the service. Each communication device may then adapt its radiation pattern so that the antenna footprint does not exceed the allocated SRB.

More details and features are mentioned in connection with the embodiments described above. The example shown in FIG. 7 may comprise one or more optional additional features corresponding to one or more facets mentioned in connection with the proposed concept or one or more examples described above (FIG. 1-6).

The facets and features described in relation to a particular one of the previous examples may also be combined with one or more of the further examples to replace an identical or similar feature of that further example or to additionally introduce the features into the further example.

Examples may be compliant to or even comprised in certain standard specifications, such as those specified by the 3GPP. Configuration information may, for example, be communicated using signaling radio bearers, e.g., by Radio Resource Control (RRC) messages, which are, for example, specified in the *.331 series of 3GPP as layer 3 control plane messages. For example, physical layer specification, e.g., by Doppler Delay Resolutions and other physical layer specifications may also be affected by present exemplary embodiments, e.g., *.201, *.211, *.212, *.213, *.214, *.216 series in the 3GPP specifications.

Examples may further be or relate to a (computer) program including a program code to execute one or more of the above methods when the program is executed on a computer, processor or other programmable hardware component. Thus, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the operations of the methods described above.

It is further understood that the disclosure of several processes, operations or functions disclosed in the description or claims shall not be construed to imply that these operations are necessarily dependent on the order described, unless explicitly stated in the individual case or necessary for technical reasons. Therefore, the previous description does not limit the execution of several operations or functions to a certain order. Furthermore, in further examples, a single operation, function, process or operation may include and/or be broken up into several sub-operations, -functions, -processes or -operations.

If some features have been described in relation to a device or system, these facets should also be understood as a description of the corresponding method. For example, a block, device or functional feature of the device or system may correspond to a feature, such as a method operation, of the corresponding method. Accordingly, features described in relation to a method shall also be understood as a description of a corresponding block, a corresponding element, a property or a functional feature of a corresponding device or a corresponding system.

If some features have been described in relation to a device or system, these facets should also be understood as a description of the corresponding method and vice versa. For example, a block, device or functional feature of the device or system may correspond to a feature, such as a method operation, of the corresponding method. Accordingly, features described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The facets and features described in relation to a particular one of the previous examples may also be combined with one or more of the further examples to replace an identical or similar feature of that further example or to additionally introduce the features into the further example.

LIST OF REFERENCE SIGNS

30*a* network entity
32*a* interface
34*a* processing circuitry
30*b* first communication device
32*b* interface
34*b* processing circuitry
30*c* second communication device
32*c* interface
34*c* processing circuitry
41 transmit information about the radiation boundary volume
42*a* transmit information about the radiation boundary volume
42*b* transmit information about the radiation boundary volume
44 communicate using the radiation boundary volume
100 method for a network entity
110 obtaining positions of a plurality of communication devices
120 determining a plurality of radiation boundary volumes
130 allocating a radiation boundary volume 140 transmitting information about the allocated radiation boundary volume
200 method for a first communication device
210 receiving from a controlling network entity
220 communicating with the second communication device
300 method for a second communication device
310 receiving from the first communication device information about a radiation boundary volume
320 communicating with the first communication device
702, 703, 704, 705, 706, 707, 708, 709 communication link
710, 720 transportation vehicle
750, 760, 762 drone
730, 770, 772, 788, 792 radiation boundary volume

What is claimed is:

1. An apparatus comprising:
one or more interfaces to communicate with a first communication device, a second communication device and/or a network entity; and
processing circuitry to control the one or more interfaces and to control communication between the first communication device and second communication device by:
obtaining positions of a plurality of communication devices;
dynamically calculating a plurality of radiation boundary volumes in an environment of the plurality of communication devices based on the positions, wherein each radiation boundary volume comprises a horizontal layer;
allocating a radiation boundary volume of the dynamically calculated plurality of radiation boundary volumes to the first communication device of the plurality of communication devices to communicate with the second communication device of the plurality of communication devices; and
transmitting information about the allocated radiation boundary volume to at least one of the first communication device and the second communication device.

2. The apparatus of claim 1, wherein a height of the horizontal layer of the radiation boundary volume depends on an area over ground radiation boundary volume.

3. The apparatus of claim 1, wherein the second communication device is assigned to the first communication device to act as a relaying system for the first communication device.

4. The apparatus of claim 3, wherein the processing circuitry controls the communication between the first communication device and second communication device further by:
obtaining information about a movement of at least one of the first communication device and the second communication device; and
allocating at least one radiation boundary volume of the dynamically calculated plurality of radiation boundary volumes to the first communication device based on the obtained information about the movement.

5. The apparatus of claim 4, wherein a time resource is different for each allocated radiation boundary volume of the dynamically calculated plurality of allocated radiation boundary volumes.

6. The apparatus of claim 1, wherein the processing circuitry controls the communication between the first communication device and second communication device further by:

reobtaining the positions of the plurality of communication devices; and adapting the allocated radiation boundary volume of the dynamically calculated plurality of allocated radiation boundary volumes based on the reobtained position of the plurality of communication devices.

7. The apparatus of claim 1, wherein the processing circuitry controls the communication between the first communication device and second communication device further by:

monitoring a number of the plurality of communication devices; and adapting the allocated radiation boundary volume of the dynamically calculated plurality of allocated radiation boundary volumes based on the number of the plurality of communication devices in response to the number of the plurality of communication devices having changed.

8. The apparatus of claim 1, wherein the processing circuitry controls the communication between the first communication device and second communication device further by:

allocating at least one of a frequency resource and a time resource for each radiation boundary volume of the dynamically calculated plurality of radiation boundary volumes.

9. The apparatus of claim 8, wherein each radiation boundary volume of the dynamically calculated plurality of allocated radiation boundary volumes has at least one of its own frequency resource pool and time resource pool.

10. A transportation vehicle comprising the apparatus of claim 1.

11. An apparatus comprising:

one or more interfaces to communicate with a first communication device, a second communication device and/or a network entity; and processing circuitry to control the one or more interfaces and to control communication between the first communication device and second communication device by:

receiving, from a controlling network entity, information about a radiation boundary volume allocated to the first communication device from a plurality of radiation boundary volumes in an environment of a plurality of communication devices to communicate with the second communication device at the first communication device, wherein the plurality of radiation boundary volumes are dynamically calculated based on obtained positions of the plurality of communication devices, wherein each radiation boundary volume comprises a horizontal layer; and communicating with the second communication device using the allocated radiation boundary volume.

12. The apparatus of claim 11, wherein the processing circuitry controls the communication between the first communication device and second communication device further by transmitting information about the allocated radiation boundary volume to the second communication device.

13. A transportation vehicle comprising the apparatus of claim 11.

14. A method for a network entity for controlling a communication between a first communication device and a second communication device, the method comprising:

obtaining positions of a plurality of communication devices;

dynamically calculating a plurality of radiation boundary volumes in an environment of the plurality of communication devices based on the positions, wherein each radiation boundary volume comprises a horizontal layer;

allocating a radiation boundary volume of the plurality of radiation boundary volumes to the first communication device of the plurality of communication devices to communicate with the second communication device of the plurality of communication devices; and transmitting information about the allocated radiation boundary volume to at least one of the first communication device and the second communication device.

15. The method of claim 14, wherein a height of the horizontal layer of the radiation boundary volume depends on an area over ground radiation boundary volume.

16. The method of claim 14, wherein the second communication device is assigned to the first communication device to act as a relaying system for the first communication device.

17. The method of claim 16, further comprising:

obtaining information about a movement of at least one of the first communication device and the second communication device; and allocating at least one radiation boundary volume of the dynamically calculated plurality of radiation boundary volumes to the first communication device based on the obtained information about the movement.

18. The method of claim 17, wherein a time resource is different for each allocated radiation boundary volume of the dynamically calculated plurality of radiation boundary volumes.

19. The method of claim 14, further comprising:

reobtaining the positions of the plurality of communication devices; and adapting the allocated radiation boundary volume based on the reobtained position of the plurality of communication devices.

20. The method of claim 14, further comprising:

monitoring a number of the plurality of communication devices; and adapting the allocated radiation boundary volume based on the number of the plurality of communication devices in response to the number of the plurality of communication devices having changed.

21. The method of claim 14, further comprising:

allocating at least one of a frequency resource and a time resource for each dynamically calculated radiation boundary volume of the dynamically calculated plurality of radiation boundary volumes.

22. The method of claim 21, wherein each dynamically calculated radiation boundary volume has at least one of its own frequency resource pool and time resource pool.

23. A non-transitory computer readable medium including a computer program having program code for performing the method of claim 14, when the computer program is executed on a computer, a processor, or a programmable hardware component.

24. A method for a first communication device for controlling a communication between the first communication device and a second communication device, the method comprising:

receiving, from a controlling network entity, information about a radiation boundary volume allocated to the first communication device from a plurality of radiation boundary volumes in an environment of a plurality of communication devices to communicate with the second communication device at the first communication device, wherein the plurality of radiation boundary volumes are calculated based on obtained positions of the plurality of communication devices, wherein each radiation boundary volume comprises a horizontal layer; and communicating with the second communication device using the dynamically calculated radiation boundary volume.

25. The method of claim 24, further comprising:

transmitting information about the dynamically calculated radiation boundary volume to the second communication device.

26. A non-transitory computer readable medium including a computer program having program code for performing the method of claim 24, when the computer program is executed on a computer, a processor, or a programmable hardware component.

27. A method for a second communication device for controlling a communication between a first communication device and a second communication device, the method comprising:

receiving, from the first communication device, information about a radiation boundary volume allocated to the first communication device from a plurality of radiation boundary volumes dynamically calculated in an environment of a plurality of communication devices for communication with the first communication device at the second communication device, wherein the plurality of radiation boundary volumes are dynamically calculated based on obtained positions of the plurality of communication devices, wherein each dynamically calculated radiation boundary volume comprises a horizontal layer; and communicating with the first communication device using the allocated radiation boundary volume.

28. A non-transitory computer readable medium including a computer program having program code for performing the method of claim 27, when the computer program is executed on a computer, a processor, or a programmable hardware component.

* * * * *